United States Patent Office 3,583,970
Patented June 8, 1971

3,583,970
MONO AZO PYRAZOLYL CONTAINING DYESTUFFS
Gerhard Wolfrum, Opladen, Walter Knobloch, Cologne, Buchheim, and Heinrich Gold, Cologne, Stammheim, Germany, assignors to Farbenfabriken Bayer Aktiengesellschaft, Leverkusen, Germany
No Drawing. Filed Mar. 22, 1967, Ser. No. 625,005
Claims priority, application Germany, Mar. 31, 1966, F 48,819
Int. Cl. C09d 29/38; D06p 1/02
U.S. Cl. 260—163                                                2 Claims

ABSTRACT OF THE DISCLOSURE

Azo dyestuffs free of sulphonic acid groups and having the formula:

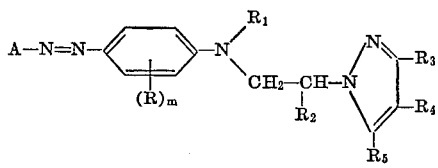

(I)

or

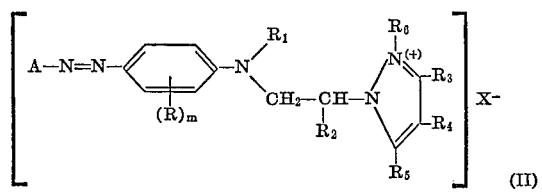

(II)

wherein A is a diazo component; R is a nonionic substituent; $R_1$ is H, aliphatic, araliphatic, or aromatic; $R_2$ is H or methyl; $R_3$, $R_4$, and $R_5$ are H, alkyl, aryl, or aralkyl; $R_4$ may also be carboalkoxy; $R_6$ is alkyl or benzyl; and $m$ is 0, 1, or 2. These dyestuffs are useful in the dyeing or printing of fibrous materials, dyestuffs (II) particularly for those based on polymers or copolymers or acrylonitrile and dicyano-ethylene and dyestuffs (I) particularly for those of aromatic polyesters. Process for preparing the above dyestuff by combining A—$NH_2$ with a coupling component having the formula:

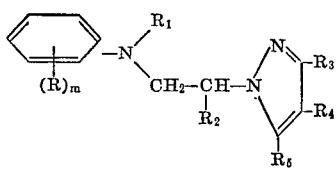

or

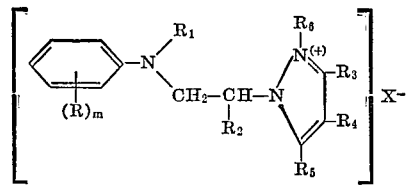

where all substituent groups have the above meanings. Process for preparing the quaternary salt azo dyestuff by reacting (I) with quaternizing agent $R_6X$.

---

The invention relates to valuable new azo dyestuffs which are free from sulphonic acid groups and correspond to the general formula

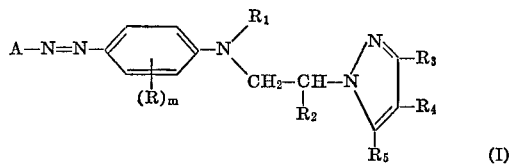

(I)

and to their water-soluble quaternary salts of the general formula

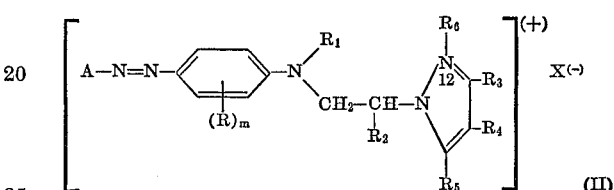

(II)

In the Formulae I and II, A denotes the radical of a diazo component, R is a non-ionic substituent, $R_1$ is hydrogen or an aliphatic, araliphatic or aromatic radical, $R_2$ is hydrogen or —$CH_3$, $R_3$ and $R_5$ are hydrogen or identical or different alkyl, aryl or aralkyl radicals, $R_4$ means hydrogen or identical or different alkyl, aryl or aralkyl radicals or a carboalkoxy group, $R_6$ is an alkyl radical or a benzyl radical, the alkyl radicals in the above groups preferably containing 1–4 carbon atoms; $m$ stands for the number 0, 1 or 2 and $X^-$ for an anion. The radical A of the diazo component is preferably a carbocyclic radical, such as a radical of the benzene series, or a heterocyclic radical, and the aryl radicals $R_3$, $R_4$ or $R_5$ are preferably phenyl, chlorophenyl, bromophenyl or alkyl (1 to 4 carbon atoms)-phenyl radicals.

Among the non-ionic substituents R the following should be specially mentioned: halogen, such as —Cl, —Br; methyl and ethyl-sulphonyl radicals; lower alkyl radicals, such as methyl, ethyl and propyl or trifluoroalkyl radicals; lower alkoxy radicals, such as methoxy and ethoxy radicals; and thioether radicals; the alkyl radicals preferably have 1–4 carbon atoms.

Aliphatic radicals $R_1$ may contain further substituents, for example, the cyano group, an alkoxy group (1–4 carbon atoms), a hydroxyethyloxy group or a carboalkoxy group, each of these groups standing in the $\beta$-position of an ethyl radical.

The new azo dyestuffs of the Formula I are prepared by combining the diazonium compound of an amine of the formula $$A—NH_2 \quad\quad\quad (III)$$

in which A has the same meaning as above, with an azo component of the general formula

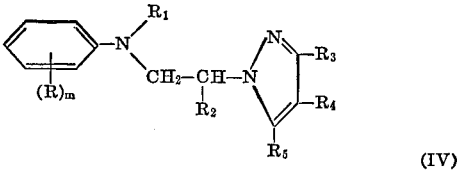

(IV)

in which R, $R_1$, $R_2$, $R_3$, $R_4$, $R_5$ and $m$ have the same meaning as above, selecting starting components which are free from sulphonic acid groups.

The quaternary salts of the new azo dyestuffs, which correspond to the general Formula II, are prepared, for example, by combining the diazonium compound of an amine of the formula $$A\text{---}NH_2 \qquad (III)$$

in which A has the same meaning as above, with an azo component of the formula

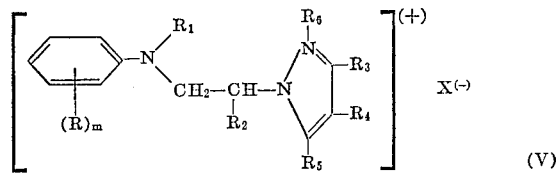

(V)

in which R, $R_1$, $R_2$, $R_3$, $R_4$, $R_5$, $R_6$, $m$ and $X^-$ have the same meaning as above, selecting starting components which are free from sulphonic acid groups.

Quaternary salts of the general Formula II, in which A denotes the radical of a carbocyclic diazo component, can also be prepared by treating azo dyestuffs which are free from sulphonic acid groups and correspond to the general formula

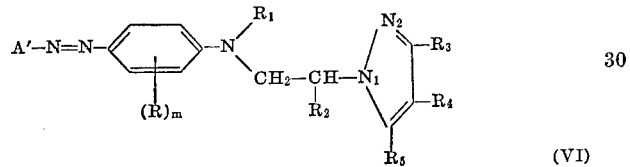

(VI)

in which R, $R_1$, $R_2$, $R_3$, $R_4$, $R_5$ and $m$ have the same meaning as above and A′ stands for a radical of the benzene series, with quaternising agents $R_6X$, with quaternisation of the pyrazole ring. It is assumed that in this reaction the alkyl or benzyl radical $R_6$ becomes attached to the nitrogen atom 2 of the pyrazole ring of the dyestuffs of the general Formula VI.

The azo components of the general Formula IV to be used according to the present process are new. They are N-{β-[pyrazolyl-(1)]-ethyl or -propyl}-anilines and their non-ionic substitution products and quaternary salts. These compounds are obtained, for example, when aniline or N-alkyl-anilines are reacted with the possibly substituted benzene-sulphonic acid esters or with the sulphuric acid semi-esters of 1-(β-hydroxyethyl)-pyrazoles, or with 1-(β-chloroethyl)- or 1(β-bromoethyl)-pyrazoles at an elevated temperature and, if desired, in an inert organic solvent, such as xylene, chlorobenzene, dichlorobenzene or methyl-naphthalene. The azo components can also be obtained by reacting N-alkyl-N-(β-hydrazinoethyl)-anilines with β-diketo compounds. The quaternary salts of the Formula V are then formed from the azo components of the general Formula IV by alkylation. The following alkylating agents can be used, for example: methyl chloride, trimethyl-oxonium boron fluoride, dimethyl sulphate, diethyl sulphate, ethyl bromide, p-toluene-sulphonic acid methyl, ethyl, propyl or butyl ester.

Suitable azo components for the synthesis of the new dyestuffs are, for example:

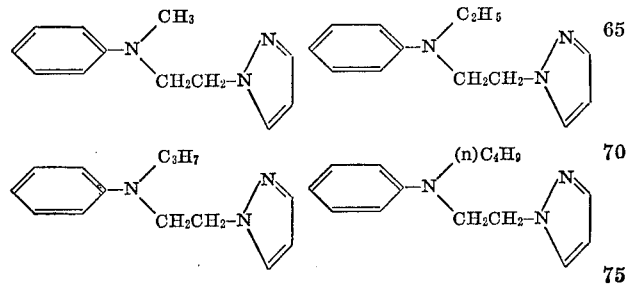

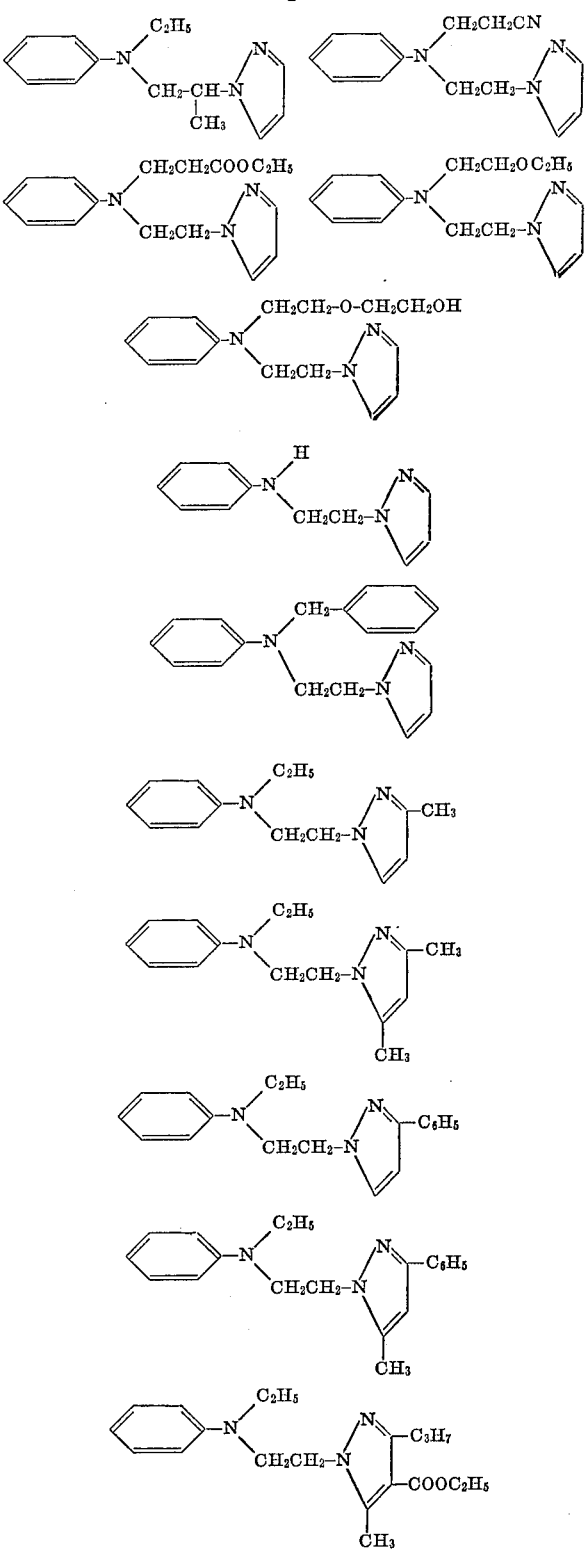

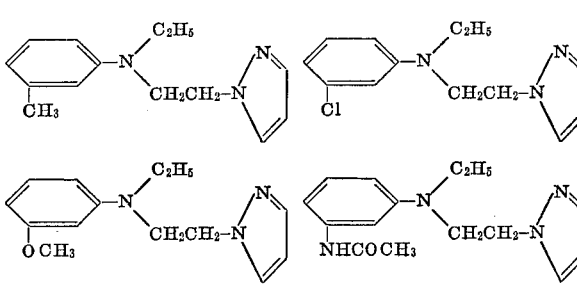

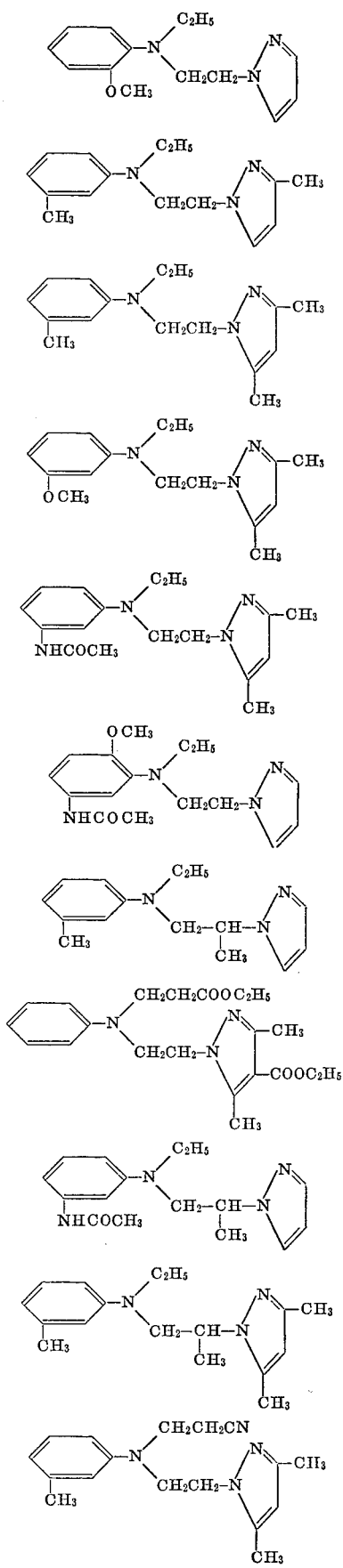

and the quaternary salts of these compounds, which carry the alkyl group or benzyl group on the nitrogen atom 2 of the pyrazole ring.

Suitable diazo components A—NH$_2$ are, for example:

aniline,
2-chloroaniline,
3-chloroaniline,
4-chloroaniline,
2-methylaniline,
3-methylaniline,
4-methylaniline,
2-ethylaniline,
3-ethylaniline,
4-ethylaniline,
2-nitroaniline,
3-nitroaniline,
4-nitroaniline,
2-chloro-4-nitroaniline,
2-chloro-3-nitroaniline,
2-chloro-4,6-dinitroaniline,
2-bromo-4,6-dinitroaniline,
2-nitro-4-chloroaniline,
2-nitro-3-chloroaniline,
2,4-dinitroaniline,
2,6-dichloro-4-nitroaniline,
2-cyano-4-nitroaniline,
2,4-dicyanoaniline,
2,3-dichloroaniline,
2,4-dichloroaniline,
3,5-dichloroaniline,
3,4-dichloroaniline,
2,4,5-trichloroaniline,
pentachloroaniline,
2-chloro-4-methylaniline,
2-methyl-4-chloroaniline,
4-aminobenzoic acid,
4-aminobenzoic acid ethyl ester,
3-nitro-4-amino-benzoic acid,
3-nitro-4-aminobenzoic acid ethyl ester,
2-aminobenzoic acid,
3-chloro-4-cyanoaniline,
3-chloro-6-cyanoaniline,
4-aminobenzoic acid amide,
4-aminobenzoic acid dimethyl-amide,
4-methylsulphonyl-aniline,
2-trifluoromethyl-4-methylsulphonyl-aniline,
2-methylsulphonyl-aniline,
2-ethylsulphonyl-4-nitroaniline,
2-chloro-4-ethylsulphonyl-aniline,
2-aminobenzene-sulphonic acid phenyl ester,
4-methoxyaniline,
3-methoxyaniline,
2-nitro-4-methoxyaniline,
2-methoxy-4-nitroaniline,
2-amino-thiazole-(1,3),
2-amino-5-nitro-thiazole-(1,3),
2-amino-benzothiazole-(1,3),
2-amino-6-ethoxybenzothiazole-(1,3),
2-amino-6-methylsulphonylbenzothiazole-(1,3),
5-amino-3-phenyl-thiadiazole-(1,2,4),
3-aminopyridine,
8-aminoquinoline,
3-aminoindazole,
3-aminotriazole-(1,2,4).

Coupling of the starting components is carried out in known manner, for example, in a neutral or weakly to strongly acidic aqueous medium.

If the dyestuffs according to the invention are prepared by quaternisation of dyestuffs of the general Formula VI, then this reaction is expediently carried out by heating in an inert organic solvent, for example, in hydrocarbons, such as benzene, toluene or xylene; halogenated hydrocarbons, such as carbon tetrachloride, tetrachloroethane, chloroform, chlorobenzene, o-dichlorobenzene; nitrated hydrocarbons, such as nitrobenzene or nitronaphthalene; or in dimethyl formamide, acetonitrile or dimethyl sulphoxide, with the use of, preferably, equivalent amounts of alkylating agents, for example, with methyl chloride, methyl bromide, methyl iodide, ethyl bromide, benzyl chloride, trimethyl-oxonium boron fluoride, dimethyl sulphate, diethyl sulphate, p-toluene-sulphonic acid methyl, ethyl or butyl ester.

The resultant quaternised dyestuffs are sparingly soluble in the solvents used and can be isolated by filtering off. If dimethyl formamide, acetonitrile or dimethyl sulphoxide is used and the quaternised dyestuffs remain partially or completely dissolved, then they can be separated by dilution with water and addition of water-soluble salts, for example, sodium or potassium chloride.

The dyestuffs of the general Formula II prepared by coupling the diazonium compounds of amines of the Formula III with the coupling components of Formula V, as well as those prepared by quaternisation of dyestuffs of Formula VI, can be purified by dissolving them in water and precipitating them by the addition of water-soluble salts, for example, sodium or potassium chloride.

The dyestuffs obtained by the present process contain the anionic radical X−, which is preferably the radical of a strong acid, for example, of sulphuric acid or its semi esters or of an aryl-sulphonic acid or is a halogen atom. However, these anions can also be replaced with the radicals of other acids, for example, of phosphoric acid, hydrofluoboric acid, formic acid, acetic acid, tartaric acid, lactic acid. The dyestuff salts can also be converted into double salts by means of inorganic salts, for example zinc chloride.

The water-insoluble dyestuffs of the general Formula I obtained by the present process are suitable for the dyeing and printing of fully synthetic fibres, especially those of polyamides, cellulose esters and polyesters and among the latter, in particular, of polyterephthalic acid glycol esters. The dyeings have good fastness properties. The dyestuffs of the general Formula II obtained by the present process are water-soluble; they are eminently suitable for the dyeing and printing of fully synthetic fibres of polymers and copolymers of acrylonitrile and dicyanoethylene, fast dyeings being thus obtained. These dyestuffs can also be used for the dyeing and printing of tanned cellulose materials, silk and leather.

In the following examples the parts are parts by weight.

EXAMPLE 1

16.2 parts 2,4-dichloroaniline are dissolved in 100 parts of water containing 25 parts of concentrated hydrochloric acid and diazotised at 0–5° C. with a solution of 6.9 parts sodium nitrite in 25 parts of water. After filtering, this diazonium salt solution is added to a solution of 21.5 parts of a coupling component of the formula

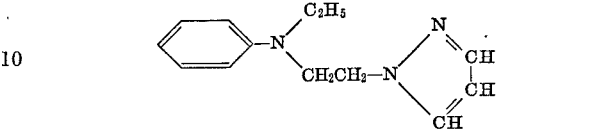

in 200 parts of 5% hydrochloric acid, and the coupling which starts immediately is completed after some time by the addition of sodium acetate. When the coupling is completed, the dyestuff formed is filtered off, washed with water until free from salt and acid, and dried. 37.2 parts of a yellow-orange powder are obtained. This dyestuff of the formula

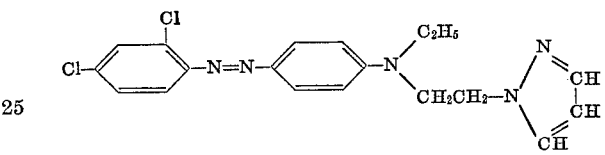

dyes fibres and fabrics made of polyamides in reddish yellow shades of good general fastness properties.

The coupling component used in the present example was prepared by reacting the p-toluene-sulphonic acid ester of 1-β-hydroxyethyl-pyrazole at 140–150° C. with N-ethyl-aniline (1 - β - hydroxyethyl - pyrazole, prepared from β-hydroxyethyl-hydrazine and 1,1,3,3-tetramethoxy-propane, is a liquid and boils at 107–108.5° C./10 mm. Hg). The coupling component thus obtained is a colourless liquid of B.P. 115–120° C./0.08 mm. Hg.

Other valuable dyestuffs which are obtained by combining the stated coupling components with the stated diazo components, are listed in Table 1.

TABLE 1

| Example No. | Diazo component | Coupling component | Shade on polyamide |
|---|---|---|---|
| 2 | 3,5-dichloroaniline | As in Example 1 | Reddish yellow. |
| 3 | 3,4-dichloroaniline | do | Do. |
| 4 | 2,4,5-trichloroaniline | do | Do. |
| 5 | Pentachloroaniline | do | Do. |
| 6 | 2-cyano-5-chloroaniline | do | Do. |
| 7 | 2,4-dicyanoaniline | do | Yellowish red. |
| 8 | 3,4-dicyanoaniline | do | Do. |
| 9 | 4-aminobenzoic acid ethyl ester | do | Reddish yellow. |
| 10 | 6-ethoxy-2-aminobenzothiazole-(1,3) | do | Red. |
| 11 | 3-phenyl-5-amino-1,2,4-thiadiazole | do | Red. |
| 12 | 2-trifluoromethyl-4-chloroaniline | do | Yellowish orange. |
| 13 | 2,4-dichloroaniline | (structure shown) | Reddish yellow. |
| 14 | 3,4-dichloroaniline | Same as above | Do. |
| 15 | 3,5-dichloroaniline | do | Do. |
| 16 | 2,4,5-trichloroaniline | do | Do. |
| 17 | Pentachloroaniline | do | Do. |
| 18 | 2-cyano-5-chloroaniline | do | Do. |
| 19 | 2,4-dicyanoaniline | do | Yellowish red. |
| 20 | 3-4-dicyanoaniline | do | Do. |
| 21 | 4-aminobenzoic acid ethyl ester | do | Reddish yellow. |
| 22 | 6-ethoxy-2-aminobenzothiazole-(1,3) | do | Red. |
| 23 | 3-phenyl-5-amino-1,2,4-thiadiazole | do | Red. |
| 24 | 2-trifluoromethyl-4-chloroaniline | do | Yellowish orange. |

The coupling component used in Examples 13–24 was prepared from N-ethyl-aniline and the p-toluene-sulphonic acid ester of 1-(β-hydroxyethyl)-3,5-dimethyl-pyrazole.

The compound boils at 138° C./0.08 mm. Hg and has a melting point of 67° C.

EXAMPLE 25

The diazonium salt solution prepared according to Example 1 from 16.2 parts 2,4-dichloro-aniline is added to a solution of 22.9 parts of a coupling component of the formula

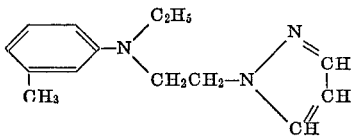

in 200 parts of 5% hydrochloric acid and the coupling, which starts immediately, is completed after some time by the addition of sodium acetate. The dyestuff, which is isolated according to the instructions of Example 1, has the formula

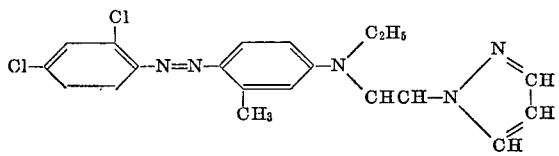

and when dried it is a yellow-orange coloured powder. The yield amounts to 38.9 parts. The dyestuff dyes polyamide fibres in strongly reddish yellow shades.

The coupling component used in the present examples was prepared by reacting N-ethyl-m-toluidine with the benzene-sulphonic acid ester of 1-β-hydroxyethyl-pyrazole at 140–150° C. and has a boiling point of 125–129° C. at 0.1 mm. Hg.

Other valuable dyestuffs, which are obtained by combining the coupling component of Example 25 with the stated diazo components, are listed in Table 2:

TABLE 2

| Example No. | Diazo component | Coupling component | Shade on polyamide |
|---|---|---|---|
| 26 | 3,5-dichloroaniline | As in Example 25 | Strongly reddish yellow. |
| 27 | 3,4-dichloroaniline | do | Do. |
| 28 | 2,4,5-trichloroaniline | do | Do. |
| 29 | Pentachloroaniline | do | Yellowish orange. |
| 30 | 2-cyano-5-chloroaniline | do | Do. |
| 31 | 2,4-dicyanoaniline | do | Red. |
| 32 | 3,4-dicyanoaniline | do | Red. |
| 33 | 4-aminobenzoic acid ethyl ester | do | Reddish yellow. |
| 34 | 6-ethoxy-2-aminobenzothiazole-(1,3) | do | Red. |
| 35 | 3-phenyl-5-amino-1,2,4-thiadiazole | do | Red. |
| 36 | 2-trifluoromethyl-4-chloroaniline | do | Orange. |

EXAMPLE 37

17.7 parts 3-phenyl-5-amino-1,2,4-thiadiazole are dissolved in 100 parts of 85% orthophosphoric acid while stirring, and the solution is combined at 0° C. to 3° C. with a solution of 6.9 parts sodium nitrite in 30 parts of concentrated sulphuric acid. Any excess nitrosyl-sulphuric acid which may be present is removed by the addition of 0.5 part urea. To this diazonium salt solution is added a solution of 21.5 parts of a coupling component of the formula

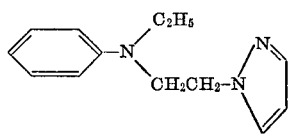

in 100 parts of glacial acetic acid. After this mixture has been stirred at 0–5° C. for 2 hours, it is stirred into 100 parts of water and buffered with sodium acetate. The resultant dyestuff is thus precipitated in crystalline form and is filtered off, washed with water until free from salt and acid, and dried. 38.2 parts of the dyestuff of the formula

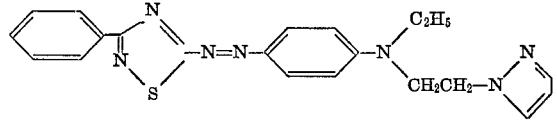

are obtained.

When applied to fibres of polyterephthalic acid glycol ester by dyeing according to the usual dyeing methods (100° C., addition of carrier), this dyestuff yields a scarlet-red dyeing of good fastness properties.

EXAMPLE 38

17.3 parts 2-chloro-4-nitroaniline are stirred with a mixture of 80 parts of concentrated hydrochloric acid and 20 parts of water at room temperature for 4 hours and after the addition of 200 parts of ice, the mixture is diazotised at 0–3° C. with a solution of 6.9 parts sodium nitrite in 20 parts of water. The diazonium salt solution is filtered and then added to a solution of 21.5 parts of a coupling component of the formula

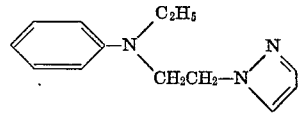

in 200 parts of 5% hydrochloric acid. The coupling giving the azo dyestuff is completed after some stirring by the addition of sodium acetate. The resultant dyestuff is isolated by filtering off, washed with water until free from salt and acid, and dried at 80° C. for several hours. 38 parts of a dyestuff of the formula

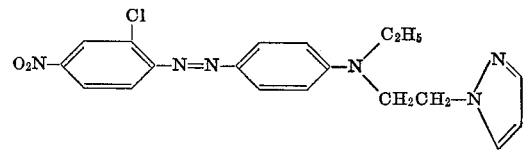

are obtained in the form of a brown-red powder. This powder is introduced into 350 parts of anhydrous chlorobenzene while stirring and the dyestuff suspension so obtained is heated to 100° C. while stirring. 12.5 parts dimethyl sulphate are then added dropwise at 100° C. within 30–40 minutes. The temperature is subsequently raised to 120° C. and maintained for 2 hours. The reaction mixture is then cooled and the dyestuff which crystallises out is filtered off. It is washed twice on a suction filter with chlorobenzene and then dried. After drying, 49.9 parts of a brown-red water-soluble dyestuff of the formula

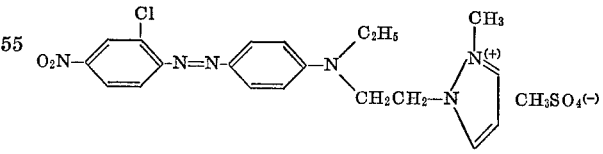

are obtained.

This dyestuff dyes filaments or fabrics of polyacrylonitrile from a weakly acidic bath under the usual dyeing conditions in red shades of very good fastness properties.

EXAMPLE 39

The diazonium salt solution prepared according to Example 38 from 17.3 parts 2-chloro-4-nitroaniline is added at 0° C., while stirring, to a solution of 34.1 parts of a coupling component of the formula

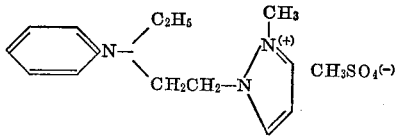

in 350 parts of water. The coupling giving the azo dyestuff is completed by the addition of sodium acetate. The resultant azo dyestuff is completely separated by the addition of sodium chloride and filtered off. The dyestuff is dissolved in 400 parts of water at 70° C. while still moist, the solution is filtered and the dyestuff is precipitated from the filtrate by the addition of sodium chloride. After filtering off, the dyestuff is dried at 60° C. 42.6 parts of a brown-red water-soluble dyestuff of the probable formula

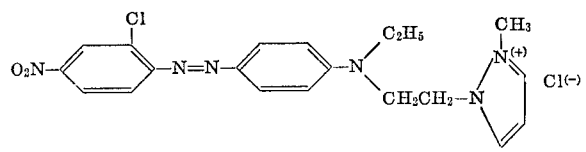

are obtained. (In the course of working up, the major part of the methosulphate anion initially present in the coupling component is replaced by the chloride anion.)

The dyestuff so prepared has the same dyestuff cation as the dyestuff of Example 38 which was prepared by a different method, i.e. by subsequent quaternisation of the finished dyestuff. The dyestuff also dyes polyacrylonitrile fibres in red shades of very good fastness properties.

The coupling component used in the present example was prepared from the coupling component of Example 38 and dimethyl sulphate in o-dichlorobenzene at 120–125° C. It was used for coupling as crude product after distilling off the o-dichlorobenzene.

Other dyestuffs, which are obtained by reacting the stated azo dyestuff with the stated alkylating agent in xylene or chlorobenzene at 100–125° C., are listed in the following Table 3:

TABLE 3

| Example No. | Azo dyestuff | Alkylating agent | Shade on polyacrylonitrile |
| --- | --- | --- | --- |
| 40 | | Dimethyl sulphate | Reddish orange. |
| 41 | | do | Bordeaux. |
| 42 | | p-Toluenesulphonic acid methyl ester. | Orange-brown. |
| 43 | | Diethyl sulphate | Bordeaux. |
| 44 | | Dimethyl sulphate | Red. |
| 45 | | do | Reddish Bordeaux. |
| 46 | | do | Yellowish red. |
| 47 | | do | Strongly reddish orange. |
| 48 | | do | Brick-red. |

TABLE 3—Continued

| Example No. | Azo dyestuff | Alkylating agent | Shade on polyacrylonitrile |
|---|---|---|---|
| 49 | H₅C₂OOC–C₆H₃(NO₂)–N=N–C₆H₃(CH₃)–N(CH₃)–CH₂CH₂–N(pyrazolyl) | ...do... | Orange. |
| 50 | O₂N–C₆H₃(SO₂CH₃)–N=N–C₆H₃(CH₃)–N(CH₃)–CH₂CH₂–N(pyrazolyl) | ...do... | Bluish Bordeaux. |
| 51 | O₂N–C₆H₄–N=N–C₆H₄–N(C₂H₅)–CH₂CH₂–N(3-methylpyrazolyl) | ...do... | Orange. |
| 52 | (o-NO₂)C₆H₄–N=N–C₆H₄–N(C₂H₅)–CH₂CH₂–N(3-methylpyrazolyl) | ...do... | Do. |
| 53 | O₂N–C₆H₃(Cl)–N=N–C₆H₄–N(C₂H₅)–CH₂CH₂–N(3-methylpyrazolyl) | Ethyl iodide | Red. |
| 54 | O₂N–C₆H₂(Cl)(Cl)–N=N–C₆H₄–N(C₂H₅)–CH₂CH₂–N(3-methylpyrazolyl) | p-Toluenesulphonic acid ethyl ester. | Orange-brown. |
| 55 | O₂N–C₆H₃(SO₂CH₃)–N=N–C₆H₄–N(C₂H₅)–CH₂CH₂–N(3-methylpyrazolyl) | Dimethyl sulphate | Bordeaux. |
| 56 | O₂N–C₆H₄–N=N–C₆H₃(CH₃)–N(C₂H₅)–CH₂CH₂–N(3-methylpyrazolyl) | ...do... | Yellowish red. |
| 57 | (o-NO₂)C₆H₄–N=N–C₆H₃(CH₃)–N(C₂H₅)–CH₂CH₂–N(3-methylpyrazolyl) | ...do... | Strongly reddish orange. |
| 58 | O₂N–C₆H₃(Cl)–N=N–C₆H₃(CH₃)–N(C₂H₅)–CH₂CH₂–N(3-methylpyrazolyl) | ...do... | Reddish Bordeaux. |
| 59 | O₂N–C₆H₂(Cl)(Cl)–N=N–C₆H₃(CH₃)–N(C₂H₅)–CH₂CH₂–N(3-methylpyrazolyl) | ...do... | Brick-red. |

TABLE 3—Continued

| Example No. | Azo dyestuff | Alkylating agent | Shade on polyacrylonitrile |
|---|---|---|---|
| 60 | O₂N—C₆H₃(SO₂CH₃)—N=N—C₆H₃(CH₃)—N(C₂H₅)(CH₂CH₂—pyrazole-3-CH₃) | ...do... | Bluish Bordeaux. |
| 61 | O₂N—C₆H₄—N=N—C₆H₄—N(C₂H₅)(CH₂CH₂—pyrazole-3,5-(CH₃)₂) | Diethyl sulphate | Reddish orange. |
| 62 | o-(NO₂)C₆H₄—N=N—C₆H₄—N(C₂H₅)(CH₂CH₂—pyrazole-3,5-(CH₃)₂) | Dimethyl sulphate | Orange. |
| 63 | O₂N—C₆H₃(Cl)—N=N—C₆H₄—N(C₂H₅)(CH₂CH₂—pyrazole-3,5-(CH₃)₂) | ...do... | Red. |
| 64 | O₂N—C₆H₂(Cl)₂—N=N—C₆H₄—N(C₂H₅)(CH₂CH₂—pyrazole-3,5-(CH₃)₂) | ...do... | Orange-brown. |
| 65 | O₂N—C₆H₃(SO₂CH₃)—N=N—C₆H₄—N(C₂H₅)(CH₂CH₂—pyrazole-3,5-(CH₃)₂) | ...do... | Bordeaux. |
| 66 | O₂N—C₆H₄—N=N—C₆H₃(CH₃)—N(C₂H₅)(CH₂CH₂—pyrazole-3,5-(CH₃)₂) | Diethyl sulphate | Yellowish red. |
| 67 | o-(NO₂)C₆H₄—N=N—C₆H₄—N(C₂H₅)(CH₂CH₂—pyrazole-3,5-(CH₃)₂) | Dimethyl sulphate | Strongly reddish orange. |
| 68 | O₂N—C₆H₃(Cl)—N=N—C₆H₃(CH₃)—N(C₂H₅)(CH₂CH₂—pyrazole-3,5-(CH₃)₂) | ...do... | Reddish Bordeaux. |

3,583,970

TABLE 3—Continued

| Example No. | Azo dyestuff | Alkylating agent | Shade on polyacrylonitrile |
|---|---|---|---|
| 69 | O₂N–(2,6-Cl₂-C₆H₂)–N=N–C₆H₃(CH₃)–N(C₂H₅)(CH₂CH₂–pyrazolyl-3,5-(CH₃)₂) | ...do... | Bride-red. |
| 70 | O₂N–(2-SO₂CH₃-C₆H₃)–N=N–C₆H₃(CH₃)–N(C₂H₅)(CH₂CH₂–pyrazolyl-3,5-(CH₃)₂) | ...do... | Bluish Bordeaux. |
| 71 | O₂N–(2-Cl-C₆H₃)–N=N–C₆H₃(Cl)–N(C₂H₅)(CH₂CH₂–pyrazolyl-3,5-(CH₃)₂) | ...do... | Bluish red. |
| 72 | O₂N–(2-Cl-C₆H₃)–N=N–C₆H₃(OCH₃)–N(C₂H₅)(CH₂CH₂–pyrazolyl-3,5-(CH₃)₂) | ...do... | Bordeaux. |
| 73 | O₂N–(2-Cl-C₆H₃)–N=N–C₆H₃(NHCOCH₃)–N(C₂H₅)(CH₂CH₂–pyrazolyl-3,5-(CH₃)₂) | ...do... | Strongly bluish red. |
| 74 | O₂N–(2-Cl-C₆H₃)–N=N–C₆H₄–N(CH₂CH₂CN)(CH₂CH₂–pyrazolyl-3,5-(CH₃)₂) | ...do... | Red. |
| 75 | O₂N–(2-Cl-C₆H₃)–N=N–C₆H₄–N(C₂H₅)(CH₂CH(CH₃)–pyrazolyl-3,5-(CH₃)₂) | ...do... | Red. |
| 76 | O₂N–(2-Cl-C₆H₃)–N=N–C₆H₄–N(C₂H₅)(CH₂CH₂–pyrazolyl-3-CH₃-4-COOC₂H₅-5-CH₃) | ...do... | Red. |

TABLE 3—Continued

| Example No. | Azo dyestuff | Alkylating agent | Shade on polyacrylonitrile |
|---|---|---|---|
| 77 | 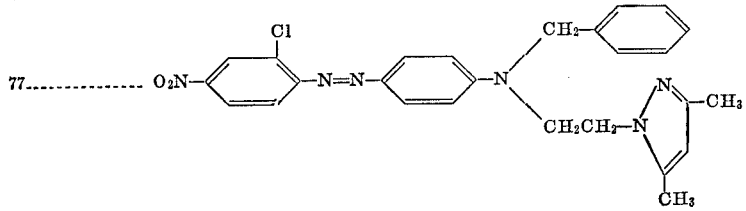 | do | Bluish red. |

Other valuable dyestuffs, which are obtained by combining the diazonium compounds of the stated amines with the stated coupling components in the usual manner, are listed in the following Table 4:

in 250 parts of glacial acetic acid. The formation of the azo dyestuff is completed by portionwise adding sodium acetate. The dyestuff formed is isolated by filtering,

TABLE 4

| Example No. | Diazo component | Coupling component | Shade on polyacrylonitrile |
|---|---|---|---|
| 78 | 2-aminobenzothiazole-(1,3) | (structure with $C_2H_5$, $CH_2CH_2$, pyrazole with $CH_3$, $CH_3SO_4^{(-)}$) | Yellowish red. |
| 79 | 2-amino-6-ethoxybenzothiazole-(1,3) | Same as above | Red. |
| 80 | 2-aminothiazole-(1,3) | do | Strongly reddish orange. |
| 81 | 2-amino-5-nitrothiazole-(1,3) | do | Violet. |
| 82 | 5-amino-3-phenyl-1,2,4-thiadizaole | do | Red. |
| 83 | 2-aminobenzothiazole-(1,3) | (structure with $C_2H_5$, $CH_3$, $CH_2CH_2$, pyrazole with $CH_3$, $CH_3SO_4^{(-)}$) | Red. |
| 84 | 2-aminothiazole-(1,3) | Same as above | Yellowish red. |
| 85 | 3-aminotriazole-(1,2,4) | do | Orange. |

EXAMPLE 86

17.3 parts of 2-chloro-4-nitroaniline are diazotised according to the method described in Example 38. The diazonium salt solution thus prepared is added to a solution of 30 parts of the coupling component of the formula

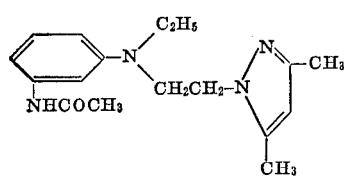

washed salt- and acid-free with water and dried. The dyestuff corresponds to the formula

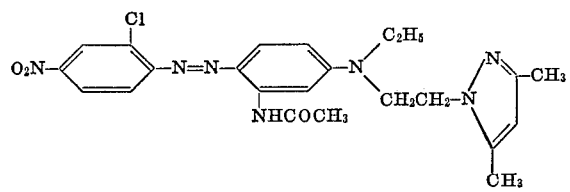

and dyes fibres from polyethyleneglycolterephthalate bluish red shades having good fastness properties.

The coupling component used in this example can be prepared by nitrating the coupling component of Example 13 in concentrated sulphuric acid with nitrating acid, reduction of the nitro compound to the amino compound and acylating the latter with acetic acid anhydride.

The following Table 5 gives further diazo and coupling components which can be combined according to the method of this example yielding valuable monoazo dyestuffs which dye fibres from aromatic polyesters in the shades indicated below.

oxy; $R_2$ is hydrogen or methyl; $R_3$ and $R_5$ are selected from the group consisting of hydrogen, alkyl of 1–4 carbon atoms, phenyl, chlorophenyl, bromophenyl, and alkylphenyl wherein the alkyl group has 1–4 carbon atoms; $R_4$ is selected from the group consisting of hydrogen, alkyl of 1–4 carbon atoms, phenyl, chlorophenyl, bromophenyl, alkylphenyl wherein the alkyl group has 1–4 carbon atoms, and carboalkoxy wherein the alkoxy group

TABLE 5

| Example No. | Diazo component | Azo component | Shade on polyester |
|---|---|---|---|
| 87 | 2-cyano-4-nitroaniline | 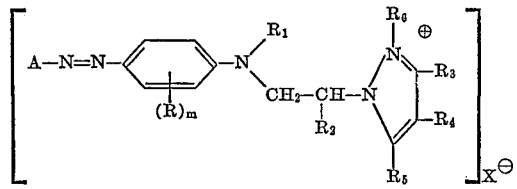 | Red Violet. |
| 88 | 3-phenyl-5-amino-1,2,4-thiadiazole | Same as above | Red. |
| 89 | 2-bromo-4,6-dinitroaniline | do | Bluish Bordeaux. |
| 90 | 2-bromo-4,6-dinitroaniline | 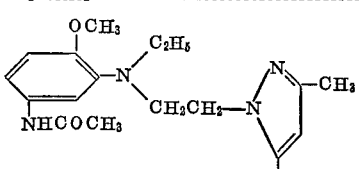 | Blue. |

We claim:
1. An azo dyestuff which is free from sulphonic acid groups and has the formula:

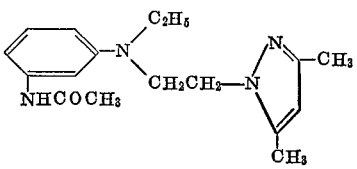

wherein A is a phenyl radical which is unsubstituted or substituted by a member of the group consisting of chloro, bromo, methyl, ethyl, trifluoromethyl, methoxy, ethoxy, nitro, cyano, carboxylic acid, carboxylic acid amide, carboxylic acid dimethyl amide, phenyl, methyl sulfonyl, phenyl sulfonyl, ethoxy carbonyl, and phenoxy sulfonyl; R is a nonionic substituent selected from the group consisting of chloro, bromo, alkyl of 1–4 carbon atoms, sulphonylalkyl of 1–4 carbon atoms, alkoxy of 1–4 carbon atoms, trifluoroalkyl of 1–4 carbon atoms, thioether, and aminocarboxymethyl; $R_1$ is a radical selected from the group consisting of hydrogen, alkyl of 1–4 carbon atoms, benzyl, and ethyl substituted in the beta-position with cyano, alkoxy of 1–4 carbon atoms, carboalkoxy of 1–4 carbon atoms, or beta-hydroxyethhas 1–4 carbon atoms; $R_6$ is benzyl or an alkyl of 1–4 carbon atoms; $m$ is 0, 1 or 2; and X is an anion.

2. A dyestuff of claim 1 corresponding to the formula:

wherein $p$ is 0, 1 or 2; $R_7$ is hydrogen or methyl; $n$ is 1, 2 or 3; and X is an anion.

References Cited
UNITED STATES PATENTS 3,329,669  7/1967  Sartori _____ 260–158

CHARLES B. PARKER, Primary Examiner

D. M. PAPUGA, Assistant Examiner

U.S. Cl. X.R.

8—13, 50, 178, 179, 542; 260—146, 147, 155, 156, 158, 162, 310

UNITED STATES PATENT OFFICE
CERTIFICATE OF CORRECTION

Patent No. USP 3,583,970     Dated June 8, 1971

Inventor(s) Gerhard WOLFRUM, et al.

It is certified that error appears in the above-identified patent and that said Letters Patent are hereby corrected as shown below:

| COLUMN | LINE | ERROR |
| --- | --- | --- |
| 1 | 43 | change "or" to ---of--- |
| 3 | 50 | change "1(β" to ---1-β--- |
| 19 | Ex. 82 | change "thiadizaole" to ---thiadiazole--- |
| 22 | 40 | change "$C_{2h}$" to ---Ch--- |

Signed and sealed this 23rd day of May 1972.

(SEAL)
Attest:

EDWARD M. FLETCHER, JR.                ROBERT GOTTSCHALK
Attesting Officer                      Commissioner of Patents